United States Patent [19]

Zhang

[11] Patent Number: 5,177,748

[45] Date of Patent: Jan. 5, 1993

[54] IN PHASE COUPLED STRIP WAVEGUIDE $CO_2$ LASER

[75] Inventor: Yongfang Zhang, Pasadena, Calif.

[73] Assignee: California Institute of Technology, Calif.

[21] Appl. No.: 740,973

[22] Filed: Aug. 6, 1991

[51] Int. Cl.$^5$ .............................. H01S 3/098
[52] U.S. Cl. ...................... 372/18; 372/64; 372/55
[58] Field of Search ....................... 372/18, 64, 55

[56] References Cited

U.S. PATENT DOCUMENTS

| | | | |
|---|---|---|---|
| 4,688,228 | 8/1987 | Newman et al. | 372/18 |
| 4,807,232 | 2/1989 | Hart et al. | 372/18 |
| 4,879,721 | 4/1989 | Braski et al. | 372/18 |

*Primary Examiner*—Léon Scott, Jr.
*Attorney, Agent, or Firm*—Brunell & May

[57] ABSTRACT

An in-phase coupled strip linear $CO_2$ waveguide laser includes an upper aluminum plate and an aluminum waveguide bed including parallel ridges, each in the range of about 2 to about 5 mm wide, at a gap of about 0.5 to 2 mm from the upper plate. The slots are about 2 mm deep to prevent discharge therein and about 1 mm wide. The width of the slots is selected to permit coupling between the discharge channels formed between each ridge and the upper plate while separating the discharge beams in each channel. Discharge in each channel is in-phase coupled in the fundamental mode to produce a single lobe far field with a simple Fabry-Perot resonator.

13 Claims, 1 Drawing Sheet

IN PHASE COUPLED STRIP WAVEGUIDE $CO_2$ LASER

ORIGIN OF THE INVENTION

The invention described herein was made in the course of research funded in part by the Air Force under ASOFR Contract No. 88-0085 and, accordingly, the U.S. Government has rights herein.

BACKGROUND OF THE INVENTION

1. Field of the Invention

This invention relates to lasers and in particular to coupled waveguide lasers, such as $CO_2$ coupled waveguide lasers.

2. Description of the Prior Art

Techniques for the design and construction of waveguide lasers, such as those used in applications requiring high power, have been developed to increase the power available from conventional lasers, such as $CO_2$ lasers. In order to overcome power density limitations in optical components, coupled strip waveguide lasers and slab waveguide lasers have been developed to spread the laser beam power across a greater area to reduce power densities without reducing total laser power.

A conventional coupled waveguide laser operates on a slot coupling principle which uses a series of slots milled in an insulating material, such as aluminum oxide or aluminum oxide coated aluminum, to form a plurality of parallel channels or slots in an insulating waveguide bed. The slotted insulating channel is positioned between a pair of conducting aluminum plates to which the RF energy is applied. The height of the insulating wall is reduced between the slots to create coupling regions in which phase coupling occurs between the channels. The coupling which occurs in these coupling regions between adjacent slots or channels introduces substantial loss to the in-phase coupled mode in conventional slot coupled designs so that although coherent, such channels are primarily coupled out-of-phase resulting in an undesirable, twin peak far field power distribution.

An alternate to the slot coupled waveguide laser is the single slab channel laser in which a large width to height ratio is used with a single slab to reduce power density requirements for components. However, high order Gaussian modes tend to dominate the oscillation in single slab lasers so that an unstable resonator has to be used to suppress the high order modes and make the fundamental mode dominant. The use of such unstable resonators increases the complexity of such devices.

What is needed are techniques for permitting higher power, lower power-density operation of waveguide lasers without the limitations, such as out-of-phase coupling or the need for unstable resonators, of the conventional designs.

SUMMARY OF THE INVENTION

The preceding and other shortcomings of the prior art are addressed and overcome by the present invention which provides a coupled waveguide laser having an upper plate, a waveguide bed including a series of parallel ridges, lasing means for forming and pumping a lasing cavity between said plate and the Waveguide bed ridges, and slot means between each of said ridges for forming separate, in-phase coupled lasing channels between the upper plate and each said ridge.

In a further aspect, the present invention provides a method of reducing power density in a laser by causing lasing discharge between a series of ridges and an upper plate in a laser cavity and in-phase coupling said lasing discharges with a slot between each pair of ridges.

These and other features and advantages of this invention will become further apparent from the detailed description that follows which is accompanied by one or more drawing figures. In the figures and description, numerals indicate the various features of the invention, like numerals referring to like features throughout both the figures and the description.

DETAILED DESCRIPTION OF THE PREFERRED EMBODIMENT

Figure 1:
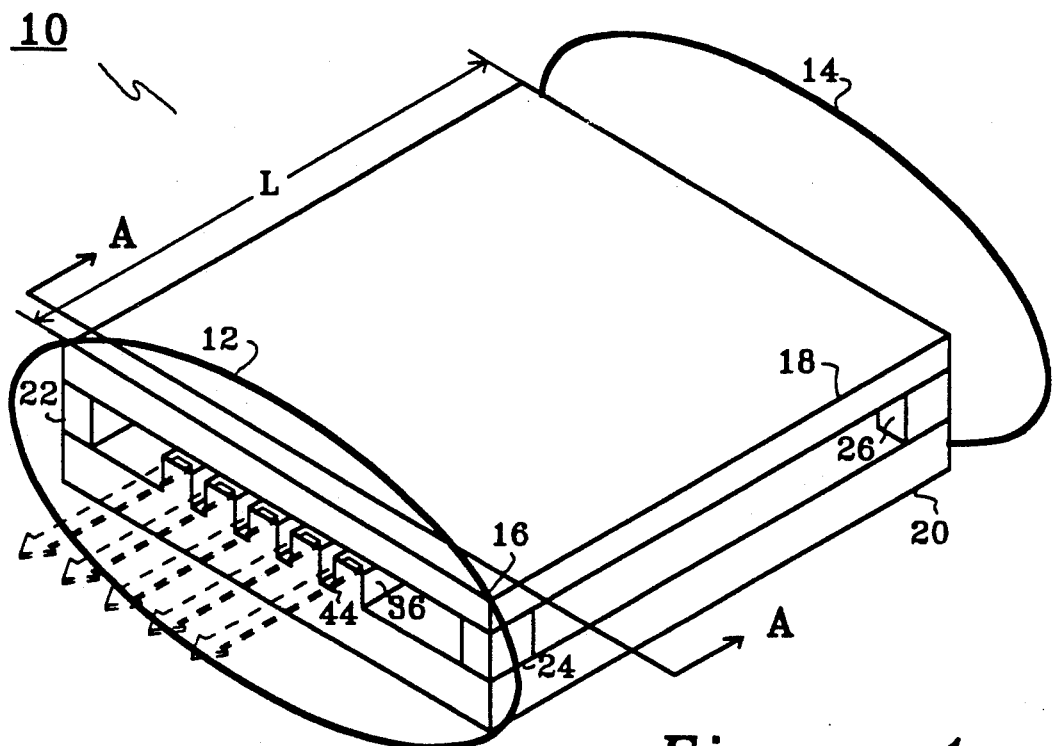
FIG. 1 is an isometric view of a coupled strip waveguide laser according to the present invention.

FIG. 1 is an isometric view of coupled strip waveguide laser 10 according to the present invention. The basic components of coupled strip waveguide laser 10 include partially reflecting cavity mirror 12 and totally reflecting cavity mirror 14 at the ends of waveguide cavity assembly 16. Length L of waveguide cavity assembly 16 is closely related to the power available from coupled strip waveguide laser 10 and is shown relatively short in FIG. 1 only for convenience of illustration.

Waveguide cavity assembly 16 includes a pair of waveguide plates, upper plate 18 and waveguide bed 20 which is preferably manufactured from a solid piece of aluminum. Plate 18 is designated as the upper plate to distinguish it from waveguide bed 20 although it need not be vertically about waveguide bed 20 to operate. Plate 18 and waveguide bed 20 are held apart in a fixed relationship by an insulating subassembly shown in FIG. 1, three components of which are visible, that is, ceramic insulators 22, 24, and 26. Aluminum oxide is a convenient ceramic material to use for insulators 22, 24, and 26.

Figure 2:
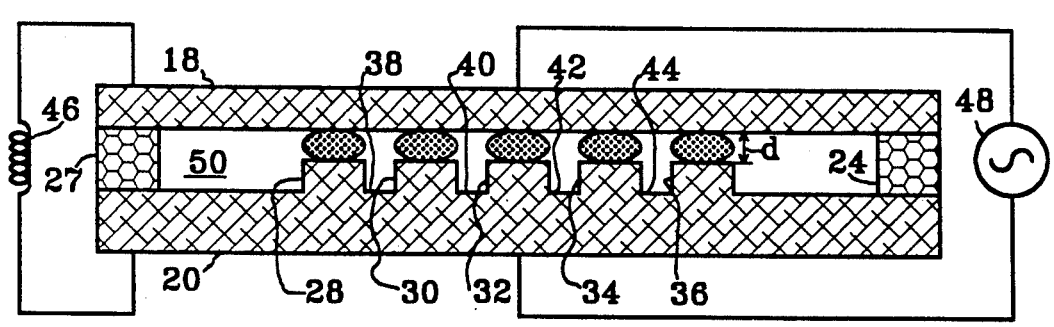
FIG. 2 is a cross section view of the coupled strip waveguide laser shown in FIG. 1 taken along the line AA.

As can be clearly seen in FIG. 2, which is a cross section taken along line AA of coupled strip Waveguide laser 10 shown in FIG. 1, waveguide bed 20 includes a plurality of raised ridges separated by slots therebetween. In the preferred embodiment shown in the figures, waveguide bed 20 includes five such ridges, waveguide ridges 28, 30, 32, 34, and 36, although different numbers of such ridges may be used.

A particular experimental implementation of coupled strip waveguide laser o using three such ridges was not as successful as expected, although implementations with two and five ridges each operate satisfactorily.

Each of the five ridges shown, ridges 28, 30, 32, 34, and 36, are separated from their neighboring ridges by a phase-coupling region in the form of a slot, shown as slots 38, 40, 42, and 44. The upper surfaces of ridges 28, 30, 32, 34, and 36 of waveguide bed 20 are separated from upper plate 18 by a fixed dimension gap, shown in FIG. 2 as dimension d.

In operation, resonant circuit or matching network 46 is connected between plate 18 and waveguide bed 20 in parallel with RF power source . Laser cavity 50, formed between plate 18 and waveguide bed 20 including waveguide ridges 28, 30, 32, 34, and 36 therein, is filled with an appropriate lasing discharge gas such as a $CO_2$ gas mixture. By proper selection of the dimensions of the ridges, slots and gaps as described below, the glow discharge occurs primary in the gaps between ridges 28, 30, 32, 34, and 36 of waveguide bed 20 and upper plate 18 to c provide the basic laser light discharge for coupled strip waveguide laser 10. There is no substantial discharge between upper plate 18 and slots 38, 40, 42, and 44.

The laser beam radiation in the channels formed in the gaps between ridges 28, 30, 32, 34, and 36 and upper plate 18 do leak across slots 38, 40, 42, and 44 enough to phase couple such laser beam channels. Because the phase coupling regions formed by slots 38, 40, 42, and 44 do not introduce substantial losses in the phase coupled mode, the channels lase primarily in the fundamental mode and are coupled together in phase. The resultant laser beam radiation through partially reflecting cavity mirror 12 is in-phase coupled and results in a single major far field lobe.

A simple Fabry-Perot resonator is adequate for use with coupled strip Waveguide laser 10 because the slots act as a mode discriminator, suppressing high order modes of operation, while permitting in-phase coupling between all the channels of the array.

In general, slots 38, 40, 42, and 44 must be narrow enough to permit phase coupling but wide enough to separate the lasing discharge or plasma in each channel and to prevent substantial fundamental mode losses. Such slots may conveniently be deep enough to prevent any discharge therein.

In an exemplary implementation of the present invention, upper plate 18 and waveguide bed 20 were constructed from sheets of aluminum such that ridges 28, 30, 32, 34, and 36 were in the range of about 2-5 mm wide. The ridges were separated by slots about 2 mm in depth and on the order of about 1-2 wide. Dimension d of the between ridges 28, 30, 32, 34, and 36 and upper plate 18 was on the order of about 0.5 to about 2 mm. The $CO_2$ gas mixture was a conventional composition of about 13 parts $N_2$, about 13 parts $CO_2$ and up to about 3 parts Xe in He at a pressure of about 100 Torr.

It should be noted that the phase coupling slots of coupled strip waveguide laser 10 according to the present invention may conveniently formed in the aluminum plate forming waveguide bed 20, rather than in an insulator, or an insulated conducting plate as would be required by the conventional slot coupled $CO_2$ strip waveguide lasers of the prior art. The use of a conducting aluminum plate as conducting waveguide bed 20 permits substantially reduced manufacturing costs.

While this invention has been described with reference to its presently preferred embodiment(s), its scope is not limited thereto. Rather, such scope is only limited insofar as defined by the following set of claims and all equivalents thereof.

What is claimed is:

1. A coupled waveguide laser, comprising:
   an upper plate;
   a waveguide bed;
   a series of parallel ridges in said waveguide bed;
   lasing means for forming and pumping a lasing cavity between said plate and the waveguide bed ridges; and
   slot means between each of said ridges for forming separate, in-phase coupled lasing channels between the upper plate and each said ridge.

2. The laser claimed in claim 1, wherein said slots have sufficient depth to prevent substantial discharge therein.

3. The laser claimed in claim 2, wherein the depth of said slots is in the range of at least about 2 mm.

4. The laser claimed in claim 1, wherein the width of said slots is sufficient to separate discharges in said channels while permitting coupling therebetween.

5. The laser claimed in claim 4, the of said slots is in the range of about 1 mm wide.

6. The laser claimed in claim 1, wherein the ridges are on the order of about 2 to about 5 mm wide.

7. The laser claimed in claim 1, further comprising:
   a lasing gas in said cavity and including substantial $CO_2$.

8. The laser claimed in claim 1 wherein there are five ridges.

9. The laser claimed in claim 1 wherein said waveguide bed is a conducting aluminum plate and said slots are formed in one surface therein forming said ridges.

10. A method of reducing power density in a laser, comprising;
    causing lasing discharge between a series of ridges and an upper plate in a laser cavity; and
    in-phase coupling said lasing discharges with a slot between each pair of ridges.

11. The method of claim 10 wherein each of said slots is sufficiently deep to prevent discharge between said slots and said upper plate.

12. The method of claim 11 wherein the width of each said slot is sufficient to separate the lasing between each ridge and the conducting plate while permitting coupling therebetween.

13. The method of claim 12 further comprising the preliminary step of:
    forming said slots in an aluminum plate to forms each of said series of ridges.

* * * * *